Feb. 3, 1953        E. J. MALCO        2,627,107
LATHE TOOL
Filed Feb. 25, 1950
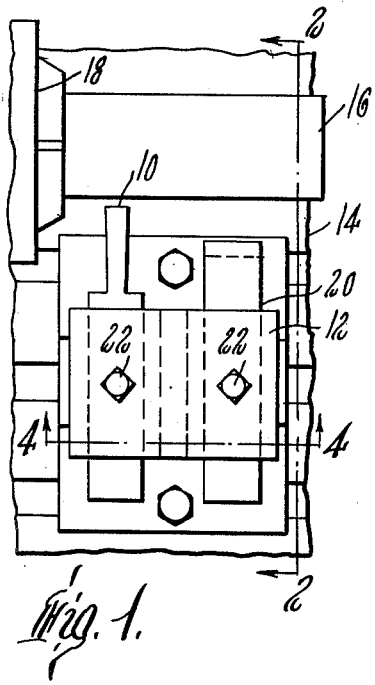
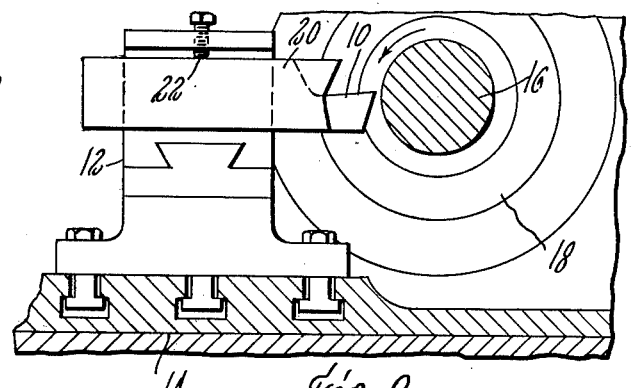
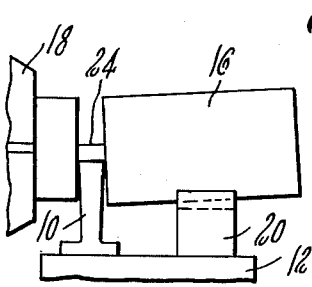
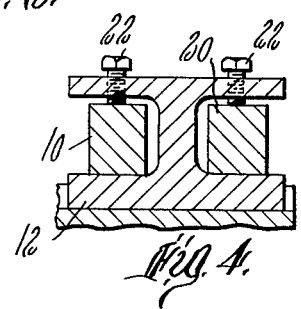
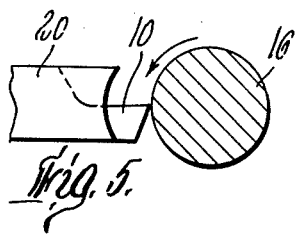
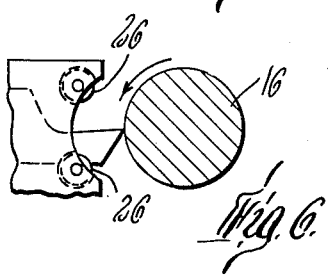
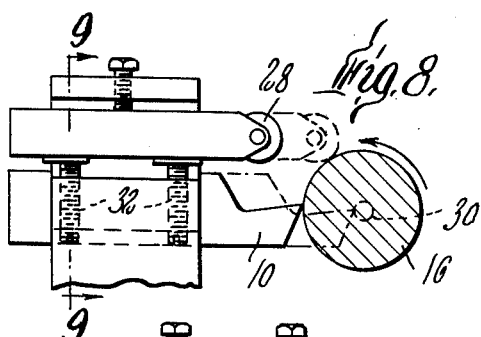
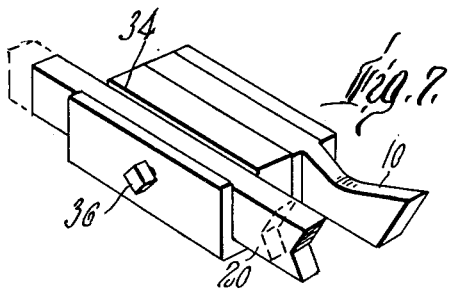
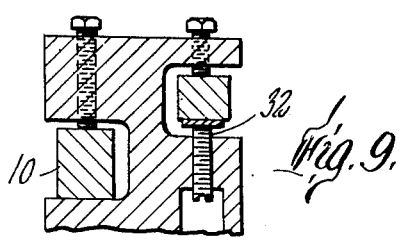
Inventor
Edward J. Malco
Wm O Moser
Atty.

Patented Feb. 3, 1953

2,627,107

UNITED STATES PATENT OFFICE 2,627,107

LATHE TOOL

Edward J. Malco, Springfield, Vt., assignor to Jones & Lamson Machine Company, Springfield, Vt., a corporation of Vermont Application February 25, 1950, Serial No. 146,301

4 Claims. (Cl. 29—96)

My invention relates to metal working and relates more particularly to an improved tool holder for use in lathes and similar machine tools.

When operations on a workpiece have been completed on a lathe, multiple spindle automatic, or the like, it is customary practice to sever the finished piece from the bar or other form of unmachined stock by a turning cut with a cut-off tool to the center of rotation.

This operation produces a severe condition for the cutting edge of the tool, particularly during the last part of the cut just prior to the completion of the cut-off. As the segment joining the finished piece with the rough stock is reduced in diameter, the cutting speed decreases rapidly to a point where excessive pressure is brought to bear on the cutting edge of the tool. This occurs just as the remaining stock is weakened so that the finished piece often begins to gyrate, and the segment being cut tends to climb over the tool edge, causing chatter and a rapid breakdown of the cutting edge of the tool.

Various types of work stabilizers have been proposed in an attempt to increase the useful life of the cut-off tool. An object of my invention is to provide an element on the tool or tool holder to break off the finished workpiece before the above noted effects come into play to damage the tool.

For a complete understanding of my invention, refer to the following specification and drawing, in which like reference characters denote like parts, and in which Figure 1 is a plan view of a tool mounted on a lathe in accordance with my invention;

Figure 2 is an end view of the same;

Figure 3 illustrates the action of the device in operation;

Figure 4 is an end sectional view of a tool block containing a tool and pusher element;

Figures 5, 6 and 8 illustrate possible modifications of my invention;

Figure 7 is a view in perspective of my improved tool holder; and

Figure 9 is a sectional end view of the holder shown in Figure 8.

Referring now more particularly to the drawing, a cut-off tool 10 is shown mounted in a block 12, which is affixed to a cross slide 14 of a lathe. In Figures 1 and 2 the tool 10 is shown in position to begin a cut-off operation on a workpiece 16, rotatably chucked in a spindle 18 in accordance with conventional practice.

Adjustably mounted alongside the tool 10 is a pusher element 20 which is adapted to engage the workpiece being severed when the tool has progressed to the desired depth. The action of the pusher 20 is clearly shown in Figure 3. The relationship between the tool edge and the work engaging surfaces of the pusher is so chosen that a narrow segment 24 remains to be cut when the pusher engages the workpiece. As the cross slide feed continues to move the tool block assembly radially toward the work, the pusher forces the piece being cut off away from the edge of the tool as shown. The weakening segment 24 then breaks, leaving the tool edge intact.

The setting of the pusher 20 with respect to the tool will depend largely upon the strength of the particular material being cut. For example, in turning tough steels, it will be necessary to reduce the segment 24 to a relatively small diameter before the pusher engages the outer periphery of the workpiece. This adjustment may be made by loosening bolts 22 and setting tool and pusher in the desired relationship. The combination of a pusher with the tool has permitted the effective use of cemented carbide cutting tools which heretofore showed a marked tendency to chip and break during the cutting done just prior to complete severance.

The pusher shown in Figures 1, 2 and 3 may be made of any suitable material. I found oil impregnated hardwood to be entirely satisfactory in many cases. Where peripheral turning speeds are high, it is often desirable to employ rollers 26 to contact the workpiece as shown in Figure 6. A pusher having a curved contacting portion complementary to the curvature of the workpiece may be used as shown in Figure 5.

In turning extremely tough materials, a marked tendency of the workpiece to rise and "crawl" over the tool edge is often observed. In such cases it is advantageous to place the pusher so as to contact the workpiece well above the axis of rotation, as in Figure 8. The roller 28 contacts the workpiece when the tool 10 is in the dotted position, thus tending to force the remaining segment 30 down and way from the tool edge. The segment then breaks, completing the cut-off without any harmful effect on the tool. Adjusting screws 32 are provided so as to accommodate different diameters of work. A simple pusher may be included in a slot 34 in a tool block as in Figure 7. It may be adjusted radially as desired and locked in position by the screw 36.

Having described my invention it will be appreciated that it may be applied wherever a cut-off operation is required and that modifications within the scope of the appended claims may occur to persons skilled in the art.

I claim:

1. In combination with a lathe tool, a pusher positioned alongside said tool and spaced therefrom along the axis of the lathe when said tool is mounted in cutting position, and a work engaging surface on said pusher, said surface being set back of the cutting edge of said tool by an amount less than the radius of the workpiece.

2. A device according to claim 1 in which said surface is shaped to fit the curvature of a finished workpiece.

3. In combination with a cut-off tool for a lathe, a pusher adjustably positioned alongside said tool and spaced therefrom along the axis of the lathe when said tool is mounted in cutting position, and a plurality of rollers on said pusher, said pusher being adjusted in fixed relation to said tool such that said rollers contact the workpiece before said tool has completed its cut to the center of rotation of the work.

4. A device according to claim 1 in which said surface is in the form of a roller positioned adjustably above and back of the cutting edge of the tool so as to contact the workpiece and force it down and away from the tool edge before the tool reaches the center of rotation of the workpiece.

EDWARD J. MALCO.

REFERENCES CITED

The following references are of record in the file of this patent:

UNITED STATES PATENTS

| Number | Name | Date |
| --- | --- | --- |
| 488,145 | Hurley | Dec. 13, 1892 |
| 1,863,907 | Leurs | June 21, 1932 |

FOREIGN PATENTS

| Number | Country | Date |
| --- | --- | --- |
| 535,125 | Great Britain | Nov. 22, 1946 |
| 588,052 | Great Britain | May 13, 1947 |